United States Patent [19]

McBroom

[11] Patent Number: 5,170,536
[45] Date of Patent: Dec. 15, 1992

[54] TENSIONER AND BARB FOR WIRE FENCE

[75] Inventor: Jerry L. McBroom, Santa Maria, Calif.

[73] Assignee: Bill Buttler, Orcutt, Calif.; a part interest

[21] Appl. No.: 755,507

[22] Filed: Aug. 26, 1991

[51] Int. Cl.⁵ .............................................. E04H 17/06
[52] U.S. Cl. ........................................ 24/71.3; 256/40
[58] Field of Search .................. 24/71.2, 71.3; 256/37, 256/40, 35, 8; 254/213

[56] References Cited

U.S. PATENT DOCUMENTS

| | | | |
|---|---|---|---|
| 912,960 | 2/1909 | Hestness | 24/71.3 |
| 1,476,026 | 12/1923 | Barber | 24/71.2 |
| 2,086,317 | 7/1937 | Hunt | 24/71.3 |
| 2,311,792 | 2/1943 | Valkenburgh | 24/71.3 |
| 5,012,559 | 5/1991 | Flannery | 24/71.3 |

Primary Examiner—James R. Brittain
Attorney, Agent, or Firm—Daniel C. McKown

[57] ABSTRACT

A tool for tensioning a fence wire winds the fence wire around a barb-like article that remains in the fence after the tool has been removed. The barb-like article includes a first piece of wire that is substantially rigid and that extends parallel to but spaced from the fence wire, and further includes a second piece of wire that is joined to the first piece of wire and that has a U-shaped central portion that partially encircles the first piece of wire at its center and is bonded to it, the legs of the U-shaped central portion straddling the fence wire so that as the article is rotated by use of the tensioning tool, the fence wire is wound around the legs. One of the legs terminates in a crook which the user engages to the fence wire to prevent it from unwinding from the article, which thereby becomes a permanent part of the fence.

1 Claim, 2 Drawing Sheets

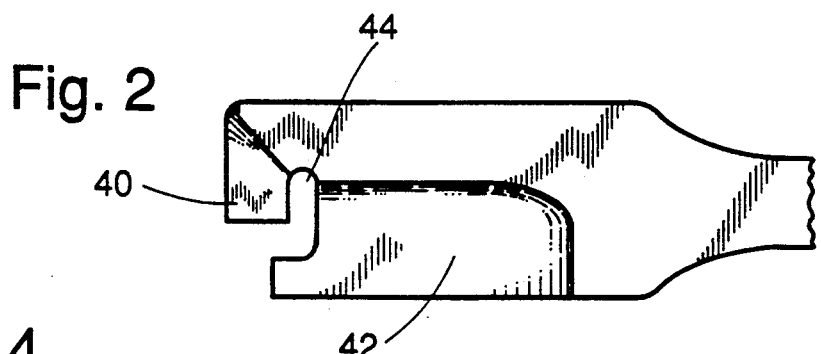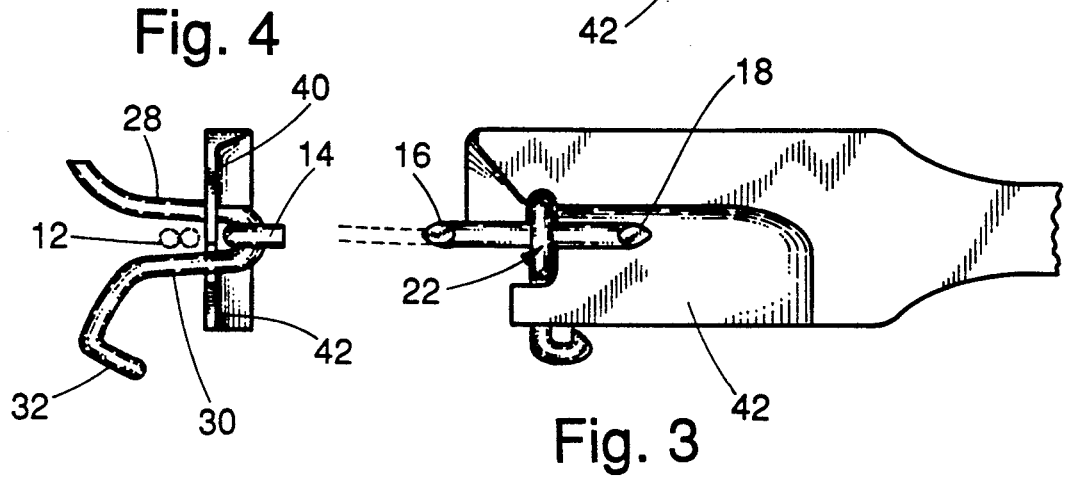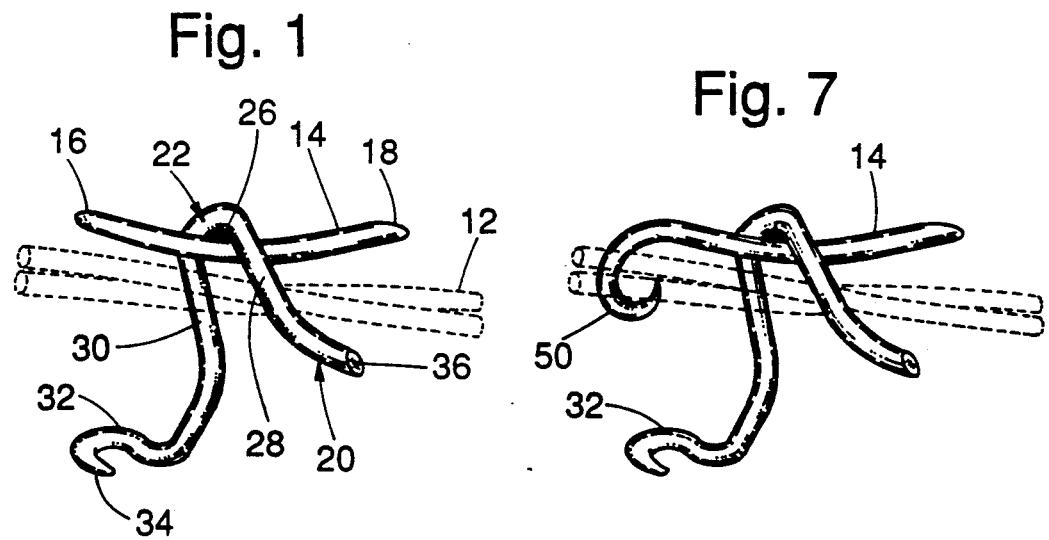

TENSIONER AND BARB FOR WIRE FENCE

BACKGROUND OF THE INVENTION

1. Field of the Invention

The present invention is in the field of wire fencing and specifically relates to a barb and a tool for inserting a barb in a barbed wire fence. The tool and barb are used to increase the tension in the barbed wire fence, and after the tension has been increased, the tool is removed leaving the barb engaged in the fence.

2. The Prior Art

A large number of devices are known in the prior art for increasing the tension in a clothesline or similar line or cable. For example, in U.S. Pat. No. 1,476,026 issued Dec. 4, 1923 to Barber, there is shown a device in which a clothesline is engaged between the legs of a U-shaped cleat that extends sideward from an elongated member. When the elongated member is rotated about an axis parallel to the legs of the U-shaped member and midway between them, the clothesline or cable is wound around the legs thereby taking up the slack in the cable and increasing the tension in the cable. At the other end of the elongated member, Barber's device includes a crook that is set over the cable to prevent the handle from rotating and thereby unwinding the cable. The device is not intended to be left indefinitely on the cable, and serves no additional useful purpose other than maintaining tension in the cable.

Comparable devices are also shown in U.S. Pat. No. 1,261,505 issued Apr. 2, 1918 to Fitz Simmons and in U.S. Pat. No. 1,972,321 issued Sep. 4, 1934 to Schiesser. The devices of the aforementioned patents must remain engaged in the clothesline so long as the increased tension is to be maintained. If a person wanted to increase the tension in a number of spans of wire, such as a barbed wire fence enclosing a large pasture, it would be necessary with the devices of the prior art to use a number of such devices, which would be relatively expensive.

In addition, because the handle of the device remains in the fence, it would be extremely easy for vandals to disengage the devices of the prior art and to steal them.

SUMMARY OF THE INVENTION

The present invention overcomes these problems of the prior art devices by separating the installing tool from the installed barb. In this way, when the tension must be increased in a number of spans, a single tool can be used to install a number of barbs. Once installed, the barbs cannot be removed without the use of the installing tool. In this way, the cost of tensioning a number of spans is greatly reduced, and the possibilities of vandalism and theft are also greatly reduced.

In addition, the installed part becomes a barb in the fence, thereby serving a second useful purpose.

The structure and use of the present invention will be described in detail below in relation to the following drawings, in which a preferred embodiment of the invention is shown by way of explanation. However, the drawings should not be considered to limit the scope of the invention.

BRIEF DESCRIPTION OF THE DRAWINGS

FIG. 1 is a perspective view showing a preferred embodiment of the barb of the present invention;

FIG. 2 is a fractional side elevational view showing a tool used for installing the barb of FIG. 1 into a fence;

FIG. 3 is a fractional side elevational view showing the barb of FIG. 1 engaged to the tool of FIG. 2 in preparation for use;

FIG. 4 is an end elevational view showing the barb of FIG. 1 engaged to the tool of FIG. 2 in preparation for use;

DETAILED DESCRIPTION OF THE PREFERRED EMBODIMENT

Figure 5:
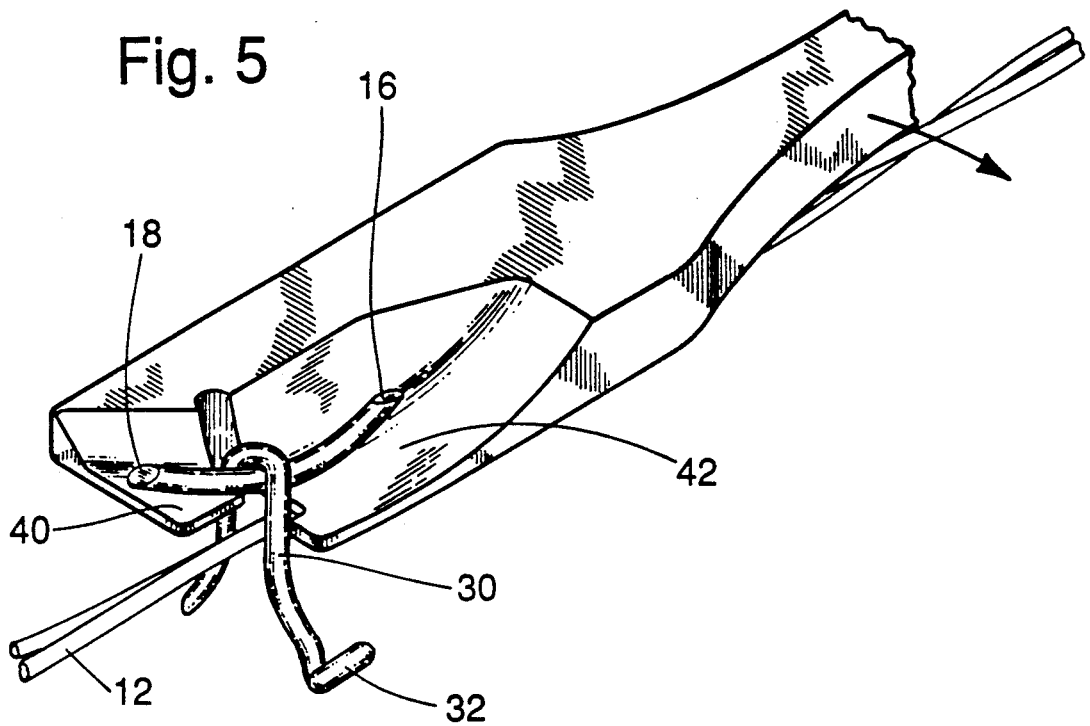
FIG. 5 is a perspective view showing the manner in which the tool of FIG. 2 is used to install the barb of FIG. 1 in a fence.

The English language does not appear to have a simple generic term that includes wires, chains, ropes, cables, and the like. Therefore it should be made clear at the outset that although the present invention will be described in the context of tensioning a barbed wire fence, the present invention could also be used to increase the tension in a rope, a cable, or a chain. Like parts will be denoted by the same reference numeral throughout.

As best seen in FIG. 1, in which a fence wire 12 is shown in dashed lines, in a preferred embodiment the present invention includes a first piece of wire 14 that is substantially rigid and that extends generally parallel to the fence wire 12 but which is arched away from the fence wire, so that the ends 16, 18 of the first piece of wire diverge somewhat from the direction of the fence wire 12.

The preferred embodiment also includes a second piece of wire 20 having a U-shaped central portion 22 that partially encircles the first piece of wire 14 and that is joined to it by a weld 26.

The U-shaped central portion 22 of the second piece of wire 20 includes legs 28, 30 that extend in a plane that is perpendicular to the fence wire 12. The legs 28, 30 continue by diverging from the U-shaped central portion 22 in the plane of it. The leg 28 terminates at the end 36 and the leg 30 is formed into a crook 32 which terminates at the end 34. The ends 16, 18, 34, 36 are cut diagonally to provide sharp points which serve as barbs. It should be noted that the plane containing the crook 32 is approximately perpendicular to the plane defined by the U-shaped central portion 22.

FIG. 2 shows a tool that is used for installing the article of FIG. 1 onto a fence wire and for tightening the fence wire. The tool includes recessed areas 40 and 42 and a slot 44. The recessed areas 40, 42 accommodate the first piece of wire 14, while the walls of the slot apply forces to the legs 28, 30 of the U-shaped central portion 22 of the article of FIG. 1 when the tool is rotated in the direction indicated by the arrow in FIG. 3.

FIGS. 3 and 4 show the article if FIG. 1 after it has been inserted into the tool of FIG. 2. In FIG. 4 it can be seen that the tool of FIG. 2, with the article of FIG. 1 inserted in it, is brought up to the fence wire 12 from one side of the fence wire 12. This permits the article to be installed without any need for climbing over the fence.

FIG. 5 is a perspective view showing the tool of FIG. 2 being used to attach the article of FIG. 1 to a fence wire 12. After inserting the article of FIG. 1 into the tool of FIG. 2, the user positions the article of FIG. 1 with respect to the fence wire 12 as shown in FIG. 5, i.e., with the legs 28, 30 straddling the fence wire 12. Thereafter, the user rotates the handle of the tool in the direction shown by the arrow, thereby causing the fence wire to be wound about the legs 28, 30. The divergence of the ends 16, 18 away from the fence wire 12 and the divergence of the legs 28, 30 serves to guide the fence wire to prevent it from disengaging from the legs 28, 30.

The present inventor has found that on a typical 10 foot span of fence, a quarter turn of the tool takes up about 2 inches of sag. After a desired amount of sag has been taken up, the user tilts the tool slightly to engage the crook 32 with the fence wire 12. Thereafter, the tool is rotated in the opposite direction, thereby disengaging it from the article of FIG. 1 which remains engaged on the fence wire 12.

Figure 6:
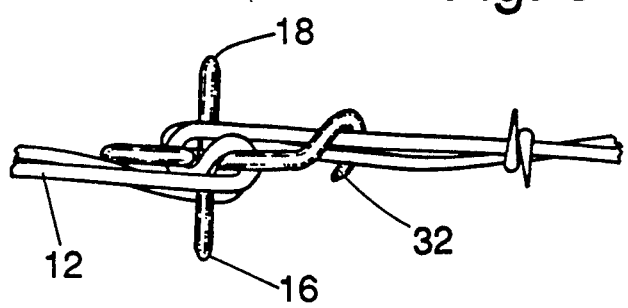
FIG. 6 is a bottom plan view showing the barb of FIG. 1 after it has been installed in a fence; and, FIG. 7 is a perspective view showing an alternative embodiment of the barb of the present invention.

After the tool has been removed, the article of FIG. 1 remains engaged in the fence wire 12 in the position shown in FIG. 6. The article becomes incorporated into the fence and serves as a barb.

The article of FIG. 1 has only one crook 32, and it can be engaged to the fence wire 12 at the end of the first, third, fifth, etc. quarter turns of the tool, that is, at the end of each half revolution. The article shown in FIG. 7 is a second preferred embodiment in which the first piece of wire 14 includes a crook 50 at its end 16. This permits the embodiment of FIG. 7 to be engaged to the fence wire 12 after each quarter turn of the tool.

Thus, there has been described an article for use in tensioning a fence wire as well as a tool for using the article. The article is installed into the fence and serves as a barb.

The foregoing detailed description is illustrative of two embodiments of the invention, and it is to be understood that additional embodiments thereof will be obvious to those skilled in the art. The embodiments described herein together with those additional embodiments are considered to be within the scope of the invention.

What is claimed is:

1. An article for use in tensioning a fence wire, comprising:

a first piece of wire having two ends, substantially rigid and extending generally parallel to but spaced from the fence wire, the ends of said first piece of wire diverging in a first direction from the fence wire;

a second piece of wire substantially rigid and having a planar U-shaped central portion with legs partially encircling said first piece of wire at its center, and bonded to said first piece of wire there, the legs of said U-shaped central portion extending in a direction opposite said first direction on either side of the fence wire, said legs thereafter diverging in the plane of said U-shaped central portion, one of said legs thus terminating, the other of said legs terminating in a crook that is oriented to engage the fence wire after the article has been rotated a quarter turn about an axis lying in the plane of said U-shaped central portion and perpendicular to the fence wire, whereby the legs of said U-shaped portion serve as a bobbin around which the wire is wound, and whereby, after a desired tension has been reached, the user engages said crook to the fence wire to prevent it from unwinding from the legs of said U-shaped portion.

* * * * *